United States Patent [19]
Van Brakel

[11] 3,930,276
[45] Jan. 6, 1976

[54] WHEEL SPINNING AND VEHICLE CONVEYING APPARATUS FOR AUTOMATIC WHEEL WASHERS

[75] Inventor: Russell A. Van Brakel, Harshaw, Wis.

[73] Assignee: Haverberg Auto Laundry Equipment Co., Chicago, Ill.

[22] Filed: Aug. 7, 1972

[21] Appl. No.: 278,258

[52] U.S. Cl. ............ 15/53 B; 15/DIG. 2; 104/172 B
[51] Int. Cl.$^2$ ............................................ B60S 3/04
[58] Field of Search ............ 15/DIG. 2, 21 R, 21 B, 15/21 C, 21 D, 21 E, 97 R, 53 B; 104/172 R, 172 B, 172 CT

[56] References Cited
UNITED STATES PATENTS

| | | | |
|---|---|---|---|
| 3,037,223 | 6/1962 | Lovsey | 15/DIG. 2 |
| 3,554,132 | 1/1971 | Hanna | 104/172 B |

*Primary Examiner*—Edward L. Roberts
*Attorney, Agent, or Firm*—Seed, Berry, Vernon & Baynham

[57] ABSTRACT

An automobile conveyor for use in conjunction with a wheel spinning device for an automatic wheel washer including an endless chain having a plurality of selectively engageable dogs pivotally secured thereto. The dogs normally travel in a position to urge an auto through the washer whereat the outboard end is in close association with the chain and beneath the automobile first supporting surface. Operating means are included whereby when an automobile is in position at least one of the dogs will be automatically moved to a position where the dog extends above the automobile supporting surface, contacts a wheel, and urges the car through the washer apparatus. At the wheel spinning and washing station the chain is forced downwardly to a position whereat it passes beneath the mechanism necessary to perform the wheel spinning operation while still retaining the outboard end of the dog above the automobile supporting surface. The continual contact by the dog assures that the automobile moves through the washer apparatus in a continuous motion.

12 Claims, 7 Drawing Figures

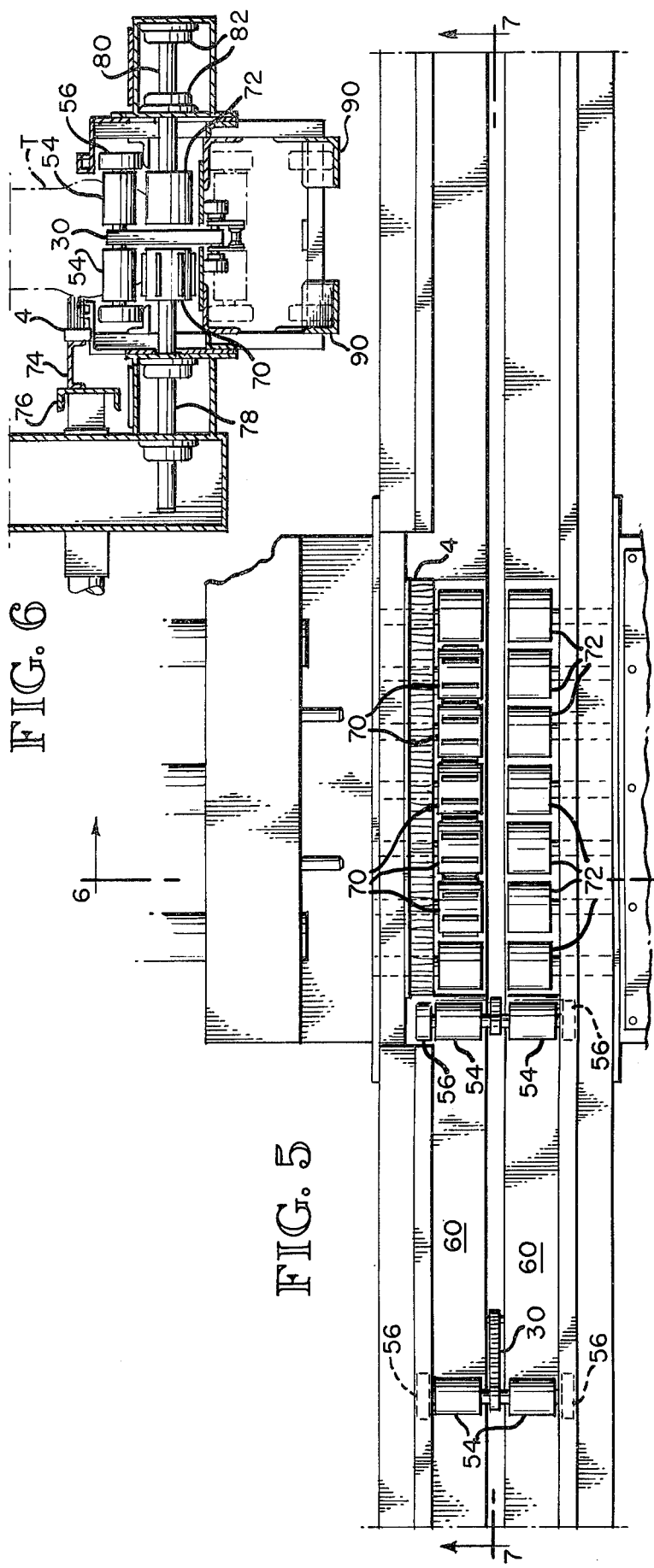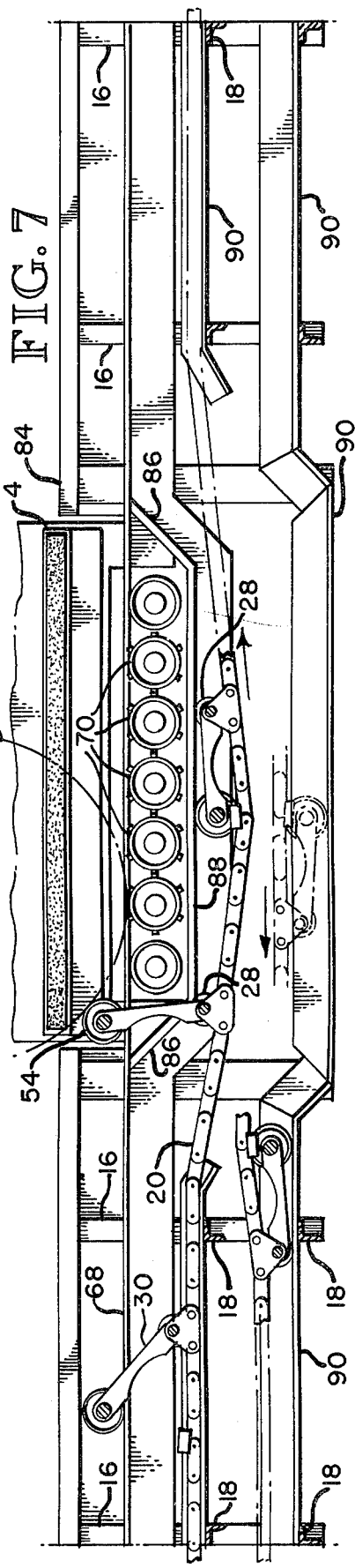

WHEEL SPINNING AND VEHICLE CONVEYING APPARATUS FOR AUTOMATIC WHEEL WASHERS

BACKGROUND OF THE INVENTION

This invention relates to automobile washing apparatuses and in particular to the means for automatically conveying an automobile through the apparatus.

One of the problem areas with automatic washing of automobiles is the thorough cleaning of the wheels and it has become the practice to spin the wheels at a rate more rapid than that related to the travel of the automobile to assure that there is a full circumferential washing of the wheel. As the wheel is spinning, a brush is placed into contact with the wheel and appropriate solvent is introduced at the scrubbing area and thus the entire wheel is washed. When the wheel is being washed and rotated at a rapid rate, the apparatus which is used to urge a car through the washing mechanism is temporarily disengaged or the chain carrying the auto contacting mechanism must be momentarily halted.

It becomes obvious that to halt the chain or to disengage the driving mechanism for any reason causes the overall washing operation to move at a slower pace, thus greatly decreasing the potential profit by lowering the per hour capacity of the washing mechanism.

With the above noted problems in mind, it is desirable to have a conveyor system wherein the automobile is continuously engaged by the conveyor mechanism throughout the entire washing operation and the automobile passes through all of the various stations at the washer apparatus at a constant rate.

It is an object, therefore, of the present invention to provide a conveyor mechanism which is adapted to continuously urge an automobile through automatic washing apparatus.

It is another object of the present invention to provide an automobile conveyor in conjunction with a wheel spinner whereby the conveyor continuously urges the automobile through the wheel spinning apparatus and is adapted to flex passing beneath and providing sufficient clearance for the driving mechanism for the wheel spinning apparatus.

It is yet another object of the present invention to provide a dog or pusher means for use on a conveyor chain incorporated in an automobile washing apparatus, the dog means normally rides in a position adjacent its carrying chains, below the automobile supporting surface but is selectively moved to a position whereat it extends above the automobile and urges the automobile through the washing apparatus.

A further object of the present invention is to provide a wheel washing apparatus for use in conjunction with an automatic automobile washing mechanism wherein the wheel washing apparatus is adapted to automatically accommodate automobiles having different wheel widths.

BRIEF DESCRIPTION OF THE DRAWINGS

FIG. 5 is a plan view of the wheel spinning and washing apparatus showing the location of the conveyor chain mechanism;

FIG. 6 is a sectional view taken along lines 6—6 of FIG. 5 showing the relative location of the necessary elements of the wheel washing operation and the configuration of the conveyor chain and attached dogs as they pass this apparatus;

FIG. 7 is an elevational view taken along lines 7—7 of FIG. 6 and detailing the means whereby the conveyor chain and its attached dogs accommodate a wheel spinning and washing apparatus.

DETAILED DESCRIPTION OF THE DRAWINGS

Figure 1:
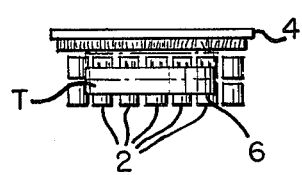
FIG. 1 is a schematic plan view of the wheel washing and spinning apparatus which may be utilized by the hereinafter described conveyor chain.
Figure 1:
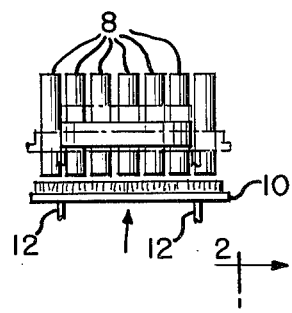

As seen in FIG. 1, a wheel washer assembly which may well be used in conjunction with the inventive conveyor mechanism comprises a series of powered rollers 2 adjacent a scrubbing brush 4. The rollers are powered to impart a high velocity spin to the wheel of the automobile which is resting upon the rollers. The rollers do not impart a forward motion to the automobile and thus a primary moving means is necessary to transport the automobile through the wheel washer assembly. The scrubbing brush 4, which is a commercially available item and thus not described in detail, comprises bristles mounted to a suitable backing. Normally included with the scrubbing brush is a nozzle for supplying the necessary detergent for an adequate scrub job. The wheel 6 of the automobile passes onto the rollers 2 whereat it is rotated at a rapid rate while being on contact with the brush 4. It is to be understood that the wheel rotation may well be opposite to the direction normally associated with the travel of the vehicle.

The opposite side of the wheel washing apparatus, i.e., that portion necessary to wash the wheels on the opposite side of the automobile, comprises elongated powered rollers 8 which cause the wheel to spin. Since the automobiles in use on the highways today have a variety of widths, the brush 10 which is used in conjunction with the rollers 8, is hydraulically controlled such that when an automobile is in position upon the rollers the piston rods 12 are forced outwardly of the piston causing the brush to push against the wheels and thus move the entire automobile toward brush 4. When the automobile has reached this position, its wheels contact the brush 4 and the sideward movement of the automobile is stopped. At this point the wheels and tires on both sides of the automobile will be in contact with their respective brushes and thus be completely scrubbed as the wheel is rapidly rotated by the respective powered rollers 2 and 8.

Figure 2:
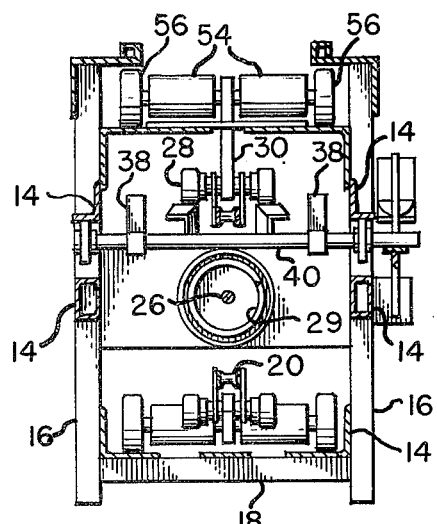
FIG. 2 is a vertical section through the inventive conveyor chain apparatus as seen along lines 2—2 of FIG. 3.
Figure 3:
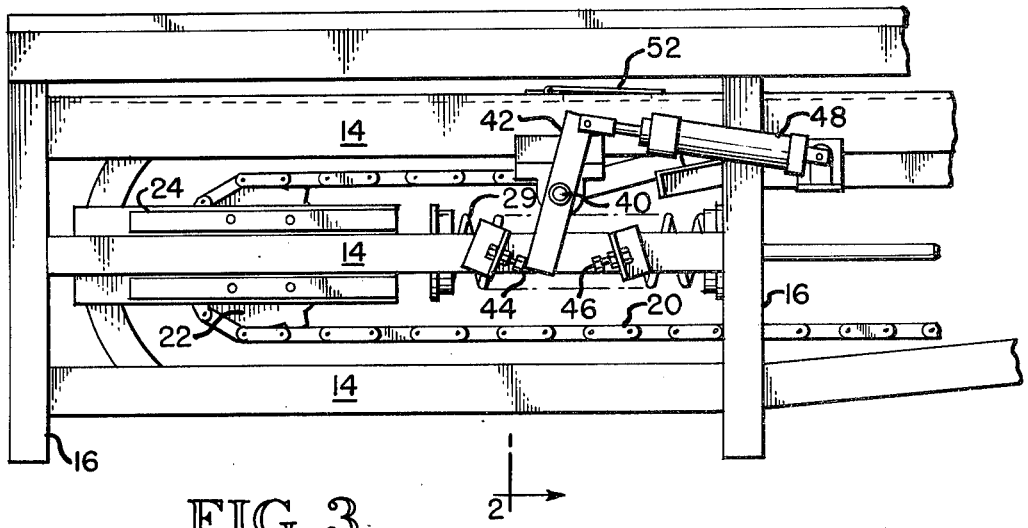
FIG. 3 is a side elevational view of the inventive conveyor chain detailing the means for tensioning the chain and the means for moving the automobile contacting dogs from their lower inactive position to their upper tire engaging position.
Figure 4:
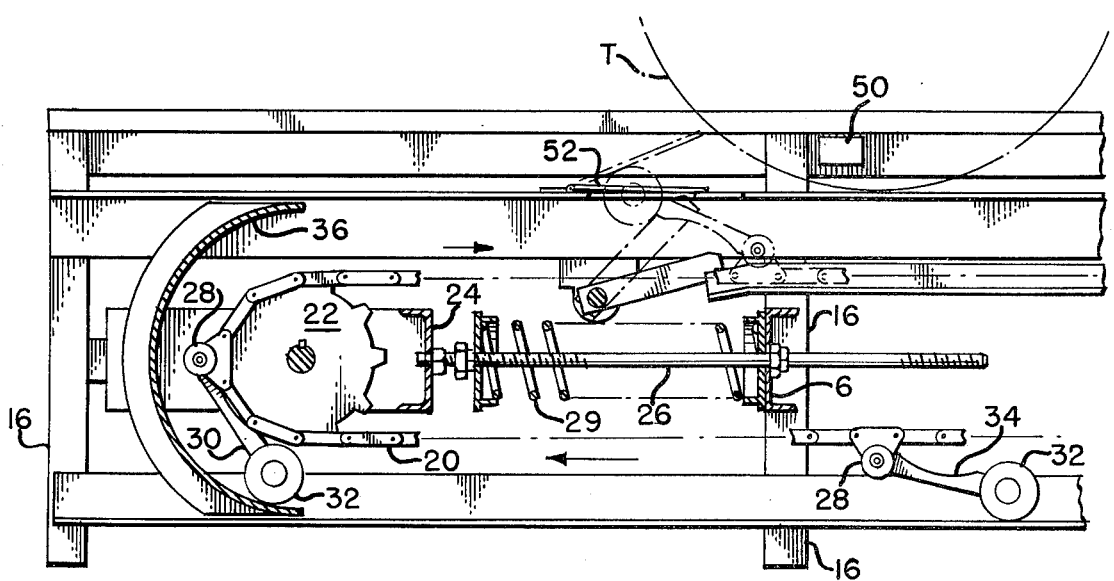
FIG. 4 is a sectional view further detailing the elements shown in FIG. 3 and further illustrating the means for moving a dog from its lower position to its upper position.

Referring now to FIGS. 2, 3 and 4 taken together, it can be seen that the vehicle conveyor apparatus basically comprises a framework having elongated generally horizontal elements 14 which extend substantially the entire length of the conveyor. The horizontal elements 14 are held in vertical spaced position by means of vertical frame elements 16 which are in turn held in a proper spaced condition by lateral horizontal joining frame members 18. Taken together, the three frame elements 14, 16 and 18 provide a rigid frame structure for the mechanism which will be hereinafter described.

Intermediate the top and bottom horizontal frame members 14 is a chain 20 which is trained around a sprocket 22 which is mounted for relative linear movement relative to the framework. The position of the sprocket 22 is controlled by the combined action of the sprocket supporting bracket 24, the threaded rod 26 which is secured between the frame member 16 and the bracket 24. A compression spring 29 is mounted between the frame member 16 and the bracket 24, continuously urging the sprocket wheel 22 to its outermost position, thus assuring a constant and proper tension upon the chain 20 for proper functioning of the mechanism. Mounted to the chain 20 are a plurality of dog or pusher elements having an inner wheel 28, an arm member 30, and an outer wheel assembly 32. As can be seen in FIG. 4, the linking member 30 has one concave surface 34. Since the dogs or pusher members normally travel in a collapsed or folded condition with the outermost end trailing, when the dog or pusher passes around the sprocket it is necessary to either provide greater clearance or alternatively provide an open portion in the arm 30 to allow the dog or pusher to lie closer to the sprocket as it passes around said sprocket. The preferred embodiment, as illustrated, includes the concave surface 34 so the guide may be placed closer to the sprocket and thus conserving upon space.

The apparatus is designed such that the outer wheel assembly 32 of the dog or pusher will rise above the automobile supporting surface only when there is an automobile in position. To selectively control the time when a dog is moved upwardly through the supporting surface, there is provided an automatically controlled ramp means 38 which is mounted upon a shaft 40. Shaft 40 extends through the side wall of the framework of the conveyor. Mounted exteriorly of the main mechanism is a lever means comprising an arm 42, keyed to the shaft 40 such that movement of the lever will cause movement of the shaft. The arm 42 has one end restricted in movement by a pair of stops 44, 46 and the other end secured to the piston rod of a ram 48. There is provided, in a portion of the automobile conveyor which extends above the automobile supporting surface, a sensing means 50 which could be a limit switch or alternatively an electric eye, such that it senses the presence of a wheel. Response of the sensing mechanism 50 to the wheel of an automobile will cause the ram to operate, lifting the ramp 52 to the position shown in phantom in FIG. 4. The ramp causes the dog to travel upwardly with its outer wheel assembly 32 pushing open the trap door 52, allowing passage of the outer wheel assembly therethrough.

As seen in FIG. 2, the outer wheel assembly 32 comprises a pair of wheel contacting rollers 54 mounted upon a shaft secured to the link member 30. Outboard of the wheel contacting rollers 54 are a pair of surface contacting rollers 56 adapted to ride upon the vehicle supporting surface when above the wheel supporting surface and to ride on an appropriate lower level when the device is in its normal position below the vehicle supporting surface.

Referring now to FIGS. 5, 6, and 7, it can be seen that the conveyor system hereinabove described is fully capable of operating in conjunction with a wheel spinning and washing apparatus. Since, with the exception of those details described with respect to FIG. 1, the apparatus is identical for both sides of the car only one side is shown and will be described in detail.

As seen in the figures, there is provided a pathway 60 to support the wheels of the vehicle. It is to be noted that the supporting surface 60 is in two essentially identical segments with a slot therebetween. The slot between these segments is to accommodate the bar 30 of the automobile pusher assembly as described hereinabove.

The wheel spinner and washer apparatus itself comprises a plurality of parallel powered rollers 70 which cause the wheel to spin. Balancing the powered wheels 70 are a plurality of coaxial idler wheels 72 on the opposite side of the slot, whereby the wheel when being washed will be fully supported and not subjected to a torque.

The construction details of the spinning device are thus seen in FIG. 6 wherein it can also be seen that the wheel pusher mechanism is adapted to ride above the wheel spinning mechanism when pushing the automobile through said mechanism and is adapted to ride below said mechanism in both the directions of travel when not pushing an automobile through the mechanism. Further to be seen in this Figure is the wheel washing brush 4 which is mounted upon a channel member 74; channel member 74 is in turn mounted upon a channel member 76; channel member 76 is secured to a ram which thus controls the position of the brush 4 assuring that it will be in contact with the tire T. The drive for the spinner rollers 70 is provided via shaft 78 and can be from any well known source, such as hydraulic motor, electric motor or the like.

Further to be seen in this view is the fact that the idler rollers 72 are mounted upon a shaft 80 which is held in a rigid position by means of a pair of spaced bearings 82 which permit rotation of the members 72 without permitting downward deflection thereon.

Referring now to FIG. 7, it can be seen that the spinner mechanism is contained within a compartment which has an upper, substantially level planer element 84 which is substantially in alignment with the automobile supporting member 60 such that when the wheel is going through the wheel spinning mechanism it will roll freely from the element 60 to the element 84. Further, the element 84 provides a supporting surface for the wheels 54, 56 of the automobile pushing apparatus. When the automobile pushing apparatus is in its upper position forcing an automobile through the wheel washer, the chain 20 will be forced downwardly by means hereinafter described, but the pushing apparatus being on the end of link member 30, stays above the wheel supporting level and continues to force the automobile through the wheel washing apparatus. The lower portion of the spinning mechanism is closed by a pair of angled ramps 86 and a substantially horizontal joining member 88 such that the combination of 86 and 88 provide a surface which is easily followed by the roller 28 at the bottom of the connector rod 30 whether the pusher mechanism is in its upper position as shown in solid or is in its lower position as shown in phantom in FIG. 7. The roller 28 following the contours 86, 88 causes the chain to go to a lower position, thus permitting continuous movement of the chain through what normally has been an impeding area. The spinning mechanism is normally mounted below the floor of the wheel washer apparatus in the path of the chain. Further to be seen in this view, is the fact that the conveyor 20 and the attached dogs are substantially supported by tracks or ramps 90 such as shown in FIG. 7 throughout most of its pathway to assure that it is in proper location. Tracks or ramps 90 serve to guide the chain and contain the conveyor chain such that it will not interfere with other mechanisms necessary for complete operation. As seen, the ramp or track 90 will serve as a part of the framework serving two purposes.

Thus, as can be seen hereinabove the present invention provides a unique automobile conveyor mechanism whereby the pusher members or means for forcing the automobile through the washing apparatus is only selectively engaged when an automobile is in position to be moved through the apparatus. Further, the conveyor mechanism itself is constructed in a unique fashion that it may pass beneath a wheel spinning and washing apparatus without interfering therewith, the construction details being such that the accommodation of both the conveying and the spinning mechanisms are easily accomplished.

The embodiments of the invention in which an exclusive property or privilege is claimed are defined as follows:

1. In a vehicle wheel washing device for wheels of a given minimum tread width, a frame, opposed projecting sets of parallel horizontal rollers journal-mounted in said frame and having their projecting ends spaced apart to define a slot between said sets for the travel of a wheel pushing arm on an endless conveyor, said slot being narrower than said minimum tread width, drive means in the frame for rotating the rollers in one of said sets in a common direction, guide means in the frame beneath said sets of rollers for guiding the endless conveyor.

2. In a vehicle washing device, a passageway for a vehicle wheel having a slot therealong, an endless conveyor beneath the passageway having a pusher arm adapted to project upwardly through said slot and engage a vehicle wheel occupying the passageway to roll it along the passageway responsive to operation of the conveyor, transverse rollers in the passageway on opposite sides of said slot, means for rotating some of said rollers such that a vehicle wheel pushed by said arm will be rotated faster by such rollers than the rolling speed induced by the pusher arm, wheel scrubbing means on one side of said passageway arranged and adapted to engage the respective side of a wheel while it is rotated by the rollers.

3. In a vehicle wheel washing device for use with an endless vehicle conveyor of the type having an upper forwardly moving conveying run and a lower return run and having spaced pusher arms arranged and adapted to project upwardly, while in the upper run, through a slot extending along a wheel passageway located above the upper run for engaging the back of vehicle wheels occupying the passageway to forwardly propel such wheels, a support frame, two opposed projecting sets of parallel horizontal rollers journal mounted on said frame and having their projecting ends spaced apart to define a travel path between said sets for passage of such pusher arms, drive means on the frame for rotating the rollers in one of said sets in a given rotational direction opposite to that of a wheel when pushed over the rollers by such a pusher arm, guide means in the frame beneath said sets of rollers for guiding such an endless conveyor and wheel scrubbing means on the frame arranged and adapted to engage the side of a wheel moving over said sets of rollers.

4. In a vehicle washing device, a travel path for the wheels on one side of a wheeled vehicle, said path being partly defined by wheel-spinning means and having a slot along its length including the portion thereof defined by said wheel-spinning means, endless conveyor means beneath said travel path having an upper conveying run and including wheel pushing means having an active position projecting upwardly through said slot while moving along said upper run, and wheel scrubbing means in the region of said wheel-spinning means movable into and out of wheel scrubbing position.

5. In a device according to claim 4, a deflecting means beneath said wheel spinning means for deflecting said upper run downwardly in the region of said wheel spinning means.

6. A device according to claim 4 in which said travel path has guide rails defining the portions of said slot endwise of said wheel-spinning means, first guide roller means on said wheel pushing means always engaging the underside of said guide rails while the wheel pushing means travels through said portions of the slot, and deflecting guide means in the region of said wheel-spinning means deflecting said upper run downwardly in said region by engagement therewith by said first guide roller means.

7. A device according to claim 6 in which said wheel pushing means has second roller means arranged to engage the back of the vehicle wheels when the wheel pushing means is active while traveling said upper run.

8. A device according to claim 4 in which said wheel pushing means has optimal active and inactive positions while in said upper run, said wheel pushing means being entirely located beneath said slot while in inactive position moving along said upper run.

9. A device according to claim 4 in which deflecting means in the region of said wheel-spinning means constantly downwardly deflects said upper run.

10. A device according to claim 4 in which said wheel pushing means has rollers arranged to engage the vehicle wheel when in active position and to engage said deflecting means when in inactive position.

11. A device according to claim 4 in which said wheel pushing means has first rollers adjoining the conveyor arranged to engage said deflecting means and be downwardly deflected when said wheel pushing means is in either active or inactive position and has second rollers arranged to engage the vehicle wheel when in active position and arranged to engage said deflecting means and be downwardly deflected when said wheel pushing means is in inactive position.

12. A vehicle wheel washing device comprising,
means forming a passageway along which wheels of one side of a car may be rolled, a slot located in said passageway, conveyor means beneath the passageway having a pusher means adapted to project upwardly through said slot and engage a vehicle wheel occupying the passageway to roll it along said passageway responsive to operation of the conveyor, wheel spinning means located in the passageway on opposite sides of said slot adapted to engage and rotate said vehicle wheel so that said wheel is moved faster by said spinning means than by said conveyor means, wheel scrubbing means on one side of said passageway arranged and adapted to engage the respective side of said wheel when it is rotated by the wheel spinning means.

* * * * *